3,457,501
PROBE FOR MEASURING CONDUCTIVITY OF AN
ELECTROLYTE SOLUTION
Maxwell Ingram, 15 Hamilton Ave.,
Dumont, N.J. 07628
Filed Aug. 18, 1966, Ser. No. 573,223
Int. Cl. G01r 11/44
U.S. Cl. 324—30                    10 Claims

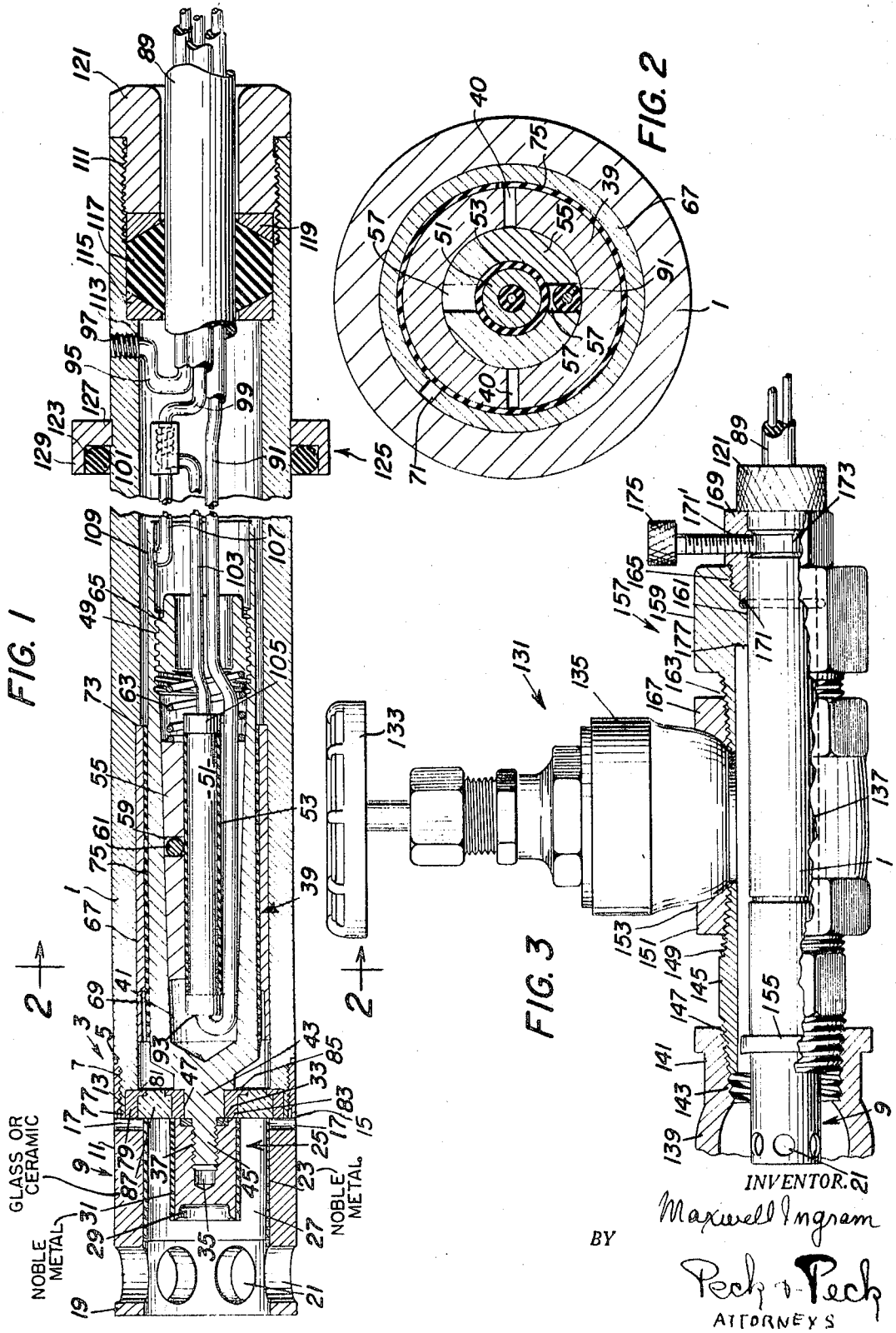

ABSTRACT OF THE DISCLOSURE

A probe for measuring conductivity of an electrolyte solution having two thermal transfer tracks from the solution to a temperature compensation means for rapid response thereof to variations in the temperature of the solution.

---

In the following description of this invention, wherein the invention is described as being a conductivity cell, a cell and a tubular body of a conductivity cell or cell, it is to be fully understood that these described conductivity cells, cells and tubular bodies are the equivalent of, and the same as, a probe for measuring conductivity of an electrolyte solution, and the tubular body described is the equivalent of a probe body.

One of the basic objects of this invention is to provide a conductivity cell which will consistently produce accurate repeat readings over long periods of time while under different pressures and temperatures.

My conductivity cell includes means within the cell assembly which electrically and automatically compensates for temperature variations in the solution being measured. It is highly desirable that such temperature compensation means rapidly responds to variations in temperature of the solution, and with this in mind I have developed a mounting structure and arrangement of the temperature compensation means within the cell assembly which results in acceleration of the response thereof to temperature variations, to materially reduce the time lag, over prior art devices, between changes in temperature of the solution and response of the compensation means.

To achieve this highly desirable rapid response of the temperature compensation means to variations in the temperature of the solution, I have provided two thermal transfer tracks from the solution to the temperature compensation means; one of such tracks being axial thereto and the other being radial thereto.

In conductivity cells of the character in which I am particularly interested, in order to secure repeated, accurate meter readings for different concentrations of solution independent of particular temperatures, it is important that the cell assembly and construction thereof produce a cell constant which remains stable.

In order to attain the aforementioned cell constant, I have so arranged and constructed my conductivity cell that the highly desired very precise cell constant may be obtained without requiring the disassembly of the cell to make mechanical alterations in the components thereof to obtain the required accurate cell constant. Such alterations, as may be necessary, may be simply, rapidly and inexpensively made by an untrained operator.

A further significant characteristic of this invention resides in the elimination of plastics as an insulating means between the two electrodes. In prior cells plastics have been used to provide the required high insulation between the two electrodes. It has been my experience that plastics are inefficient when used for this purpose since, among other objections they are subject to distortion or deformation, are affected by high temperatures and liquids will cohere to plastics so that true zero conductivity readings may not be obtained.

I have overcome the aforementioned, and other, inherent objects to the use of plastic insulating means, by using as the insulating means between the two electrodes, a hermetic seal, or glass or ceramic bonded to metal, which electrically insulates the two electrodes and continually withstands high temperatures and pressures, is distortion free, is mechanical shock resistant, and will better withstand high vacuums.

The type of seal which I have developed for insulating the two electrodes is permanent and will last indefinitely in actual use in the measuring of the conductivity of solutions and it is also permanent and will last indefinitely on the shelf without any distortion or change in cell constant characteristics.

A further significant advantage of the hermetic seal, which I have developed, resides in the fact that it is easier to clean and will remain clean longer than such seals which are made with plastics.

It has been conventional practice where plastic seals are used to provide a continuous compression on the seal by means of springs. In my construction no springs are used for this purpose and thus there is no distortion of the seal as in the case of plastics.

It is also an object of this invention to provide a conductivity cell which lends itself to easy and quick servicing and cleaning, and may be readily and simply assembled by ordinary soldering methods.

A further feature of my invention lies in the novel construction whereby the electrodes are interchangeable, since they may be removed and replaced with facility by other comparable electrodes of the same size and style.

With reference to the thermal transfer tracks which have been mentioned above, it is significant that the means I have provided functions to both put heat into and take heat out of the temperature compensation means, and such means also serves as spacers and mounting means for the temperature compensation means.

My conductivity cell is adaptable for combination with a gate valve which is often used for mounting conductivity cells in solution, to conductivity of which is being measured.

The conductivity cell of this invention may be combined and used with a gate valve with only minor modifications being necessary, which do not affect the significant features and advantageous characteristics thereof.

The combination with a gate valve is simply and easily affected and means are provided to prevent complete removal of the cell before the valve is closed.

With the foregoing general objects, features and results in view, as well as certain others which will be apparent from the following explanation, the invention consists in certain novel features in design, construction, mounting and combination of elements, as will be more fully and particularly referred to and specified hereinafter.

FIG. 1 is a view in section in side elevation of my conductivity cell.

FIG. 2 is a view taken on line 2—2 of FIG. 1.

FIG. 3 is a side elevational view of my conductivity cell somewhat modified and combined with a gate valve.

In the accompanying drawings I have designated the body of the cell or probe by the reference numeral 1, the body 1 is tubular and is preferably formed of brass, is in electrical contact with the outer electrode, and carries one polarity of the electrical current to the outer electrode, as will be explained. Adjacent to but rearwardly spaced from the forward end of the body 1, I provide a stepped construction designated in its entirety by the numeral 3, and positioned in this stepped construction is a locking washer 5 formed of bronze. Forwardly of the stepped construction 3 the forward external circumferential surface of the cell body 1 is externally threaded as at 7, and the outer electrode designated in its entirety by the numeral 9, comprises what I shall term a forward body portion 11 from the rear end of which extends an internally threaded lip or flange 13. It will be apparent from FIGURE 1 of the drawings that this outer electrode 9 is removably attached to the cell body 1 by screwing the internally threaded flange 13 on the external thread 7 of the cell body 1. In order to facilitate the removable attachment of the outer electrode 9 to the cell body 1, I have undercut both of these members as at 15. The outer electrode 9 is of substantially the same I.D. as is the I.D. of the cell body 1 and is, of course, of cylindrical construction as is the cell body. Adjacent to the rear end of the outer electrode 9 I provided a plurality of circumferentially spaced apertures 17 which function to prevent the formation of air pockets within the outer electrode 9. Between the outer end 19 and the body portion 11 of the outer electrode 9, I provide a plurality of circumferentially spaced apertures or openings 21, functioning as flow openings, so that the solution which is being measured and in which the cell assembly is positioned may flow through such apertures and into the interior of the outer electrode 9 and between the interior thereof and the exterior of the inner electrode, as will be hereinafter explained.

The internal circumferential surface of the outer electrode is sheathed with a noble metal such as platinum, palladium, gold or the like, 23, which may be soldered, or otherwise firmly caused to adhere to the internal circumferential surface of the outer electrode.

I have designated the inner electrode in its entirety by the numeral 25, and as will be fully recognized by careful consideration of the drawings, the inner electrode 25 is positioned concentrically with respect to the outer electrode and is of less diameter than the outer electrode so as to provide an area 27 between these two electrodes, so that the conductivity of the solution flowing between the two electrodes may be measured.

The forward end of the inner electrode 25 is provided with an indentation 29, the depth of which remains constant even when the length of the inner electrode is varied by a mechanical operation as will be explained, to provide the highly desired cell constant. The exterior circumferential surface of the inner electrode 25, with the exception of the surface of the indentation 29, is coated with a noble metal 31 which may be platinum, palladium, or the like. The rear end of the inner electrode 25 is provided with an annular groove in which is positioned a copper washer, which I have designated by the numeral 33. Centrally of the circular shaped inner electrode 25, and opening through the rear end thereof, is an elongated annular cavity or recess 35, a portion of which is threaded, as at 37, so that the inner electrode may be removably assembled to the remaining components of the conductivity cell.

The conductivity cell includes, as one of its components, a temperature compensation means, or thermistor housing, formed of brass and designated generally by the numeral 39. The major, or body portion of the housing 39 is of cylindrical configuration to provide a hollow internal space 41 therein in which the temperature compensation means, or thermistor, is housed in a manner as will be hereinafter explained. The hollow length of housing 39 is formed with an external diameter which is substantially uniform throughout its length, while the internal diameter thereof increases rearwardly at a uniform rate for a purpose to be explained, and the diameter and length of the housing 39 is less than that of the body 1. The housing 39 is saw slotted as at 40 from the rear end thereof to a point rearwardly spaced from the body portion 43.

At its forward end the housing 39 is closed forming a solid forwardly projecting end 43 from which forwardly extends an externally threaded stud 45, and a part of end 43 is of reduced diameter as at 47, to form, in effect, a continuous annular groove.

The housing 39 is provided with internal threading 49 toward, but forwardly removed from, the rear end thereof, and the rear end of the housing is open for receiving the components of the cell assembly which are mounted therein.

An elongated temperature compensation means, or thermistor, 51 is mounted within the housing 39, and is completely received therein in position centrally thereof by mounting means which will hereinafter be described. The temperature compensation member 51 is provided with an insulating sheath 53, which may be a high dielectric insulating varnish. Since the temperature compensation member 51 is of less diameter than the I.D. of the housing, I mount and support it therein by heat transfer and supporting means in the following manner.

When the housing 39 is positioned in cell body 1, as illustrated in FIG. 1, and the thermistor 51 is inserted in housing 39, the thermistor is properly positioned and maintained therein by means of a brass supporting and thermal transfer element 55 of generally the shape of a frustum. The element 55 is formed with a taper on the outside, is split through the center at diametrically opposed points and for its full length as at 57. Substantially intermediate the ends of element 55 I provide a circumferential groove in which is disposed a split ring clamping spring 61, which functions to maintain the two parts of the frustum together and to urge them into close thermal contact with thermistor 51.

Since the frustum shaped thermal transfer element 55 is formed with the outside taper, it will, when slipped in the housing 39 between it and the thermistor 51, mate with the corresponding inside taper of the housing, and will function somewhat as a wedge, or will produce a wedging effect. Thus, due to the construction of the housing and the frustum shaped element 55, the two parts are self locating and match perfectly to facilitate a good thermal transfer to thermistor 51, in a manner to be fully explained. When the frustum element 55 is inserted into position between the housing and thermistor it will be compressed by the split clamping ring 61 and held closely and tightly around and embracing the thermistor.

The frustum supporting and thermal transfer element 55 is removably maintained in fully inserted position in contacting thermal transfer relation with housing 39 and thermistor 51, by means of a compression spring 63, one end of which bears against frustum element 55 while the other end bears against tension nut 65 which is threaded on threads 49 in the housing 39. The spring maintains pressure against the rear or larger end of frustum element 55 to force it against the inside of housing 39, and the thermistor, for maximum contact area and thermal conductivity. The amount of tension on the spring is controlled by rotation of the tension nut 65.

It is within my contemplation to mount the thermistor 51 in epoxy, instead of using the frustum element 55. If epoxy is used the thermistor is potted, or encapsulated.

I provide a further thermal transfer element or cylinder 67, which, when assembled in the cell, its exterior circumference is in thermal transfer contact with the interior circumferential surface of the cell body 1, and also is in electric contact therewith. The thermal transfer cylinder 67 is formed, along a relatively short portion of its forward length, as at 69, with a bore which is of greater diameter than the remainder of the bore thereof. The purpose of this construction will be hereinafter described. The thermal transfer cylinder 67 comprises essentially a tube formed of brass, and is provided with one longitudinally extending split or saw cut 71 which extends from one end to the other end thereof. The thermal transfer cylinder 67 is inserted into the forward end of the cell body 1 and is compressed as it is inserted therein, such compression being possible because of the saw cut, and it is inserted until its rear end contacts and abuts against a shoulder 73 which is formed in the cell body 1. Thus, from the shoulder 73 forwardly the bore of the cell body 1 is greater than the bore thereof which extends rearwardly from the shoulder 73.

An insulating sleeve 75, having a very high dielectric strength and capable of withstanding high temperatures, such as Teflon, extends about the thermistor housing 39. The thermal transfer tube or cylinder 67 is inserted rearwardly through the front end of the cell body 1, until the rear end thereof is in abutment with the shoulder 73, whereupon the housing 39 is inserted rearwardly from the forward end of the cell body 1, so that the thermal transfer tube 67 is positioned between the cell body 1 and the housing 39, with the insulating sleeve 75 electrically insulating the housing 39 from the cell body 1 and the thermal transfer tube or cylinder 67. It will be apparent that the housing 39 tightly fits into the thermal transfer tube 67, and because of the saw cut along the length of tube 67 it will be squeezed inwardly when inserting into the housing, so that when released it springs back to produce a tight fit against the inside wall of the cell body 1. Also the enlarged bore 69 of the thermal transfer tube 67 facilitates the insertion of the housing 39 within such thermal transfer tube.

With the components so assembled the thermistor 51 may be inserted within the cylindrical hollow portion 41 of the housing 39, whereupon the thermal transfer element 55 is forced forwardly between the internal wall of the housing and the insulating 53 on the thermistor 51 and is maintained in such wedging tight position by means of the compression spring 63 and the tension nut 59. It will be understood that split ring 61 will function to hold the two parts of element 55 together in tight thermal transfer position against the thermistor.

The cell body 1, at its forward internal end, is formed with a continuous groove 77, and consideration of FIG. 1 of the drawings clearly illustrates that this groove 77 is opposite groove 47 in the body portion 43 of the housing 39, when the latter is in operative position within the cell body.

The hermetic seal which I have devised for insulating the inner and outer electrodes, and for sealing the forward end of the cell body 1 against entrance therein of the solution being measured by the conductivity cell, comprises a frame which is preferably, though not necessarily, formed of nickel iron alloy, comprising a base 79 which is seated in the internal groove 77 in the cell housing 1 and is soldered therein. From the rear end of this base 79 extends inwardly of the cell a flange 81. It will, of course, be recognized that the frame comprising the base 79 and the inwardly turned flange 81 are of annular configuration and are of continuous construction.

A similar and complementary frame member is provided and comprises a base 83 which is positioned and soldered within the groove 47 which is formed in the body portion 43 of the housing 39. From the rear end of the base 83 extends a flange 85 which is directed toward but spaced from the opposing flange 81 which extends from the base 79 of the other frame member. The insulating and sealing component of the insulating seal comprises a glass or ceramic material 87, which extends not only between the two base elements 79 and 83 of the frame but also into the area between the opposing flanges 81 and 85 of the frame. This glass or ceramic seal is provided as a unit, which is formed by heat treatment of the frame and glass or ceramic insulating and sealing means, so that a chemical seal or bond is provided between the metal frames, inner and outer annular rings, and the glass or ceramic insulating material. It will be apparent that such a seal which completely eliminates the necessity for using any plastic materials, has the highly desirable advantages which have been mentioned above, provides excellent insulating means between the inner and outer electrodes, seals the forward end of the cell body and will continuously withstand high temperatures and pressures without distortion or deformation.

When the inner electrode is assembled on and in electrical contact with the thermistor housing 39, it is screwed on the forwardly projecting stud 45 until the annular rearward end thereof, adjacent the copper washer 33, is in abutment with the base 83 of the frame which in turn is in electrical contact with the housing 39, the copper washer likewise being in electrical contact with the housing 39. With the inner electrode 25 so mounted on the stud 45, it is positioned within and spaced from the outer electrode 9 so that the solution at 27, the conductivity of which is being measured, will flow and be contained within the area between the inner and outer electrodes, and such solution will be prevented, by the described hermetic seal, from passing rearwardly from the area between the electrodes and into the interior of the cell body 1.

It will be now apparent that I have evolved a mounting arrangement and construction whereby the length of the inner electrode may be varied with great simplicity and without disassembling the entire device, in order to obtain the necessary and required precise cell constant. In order to accomplish this it is merely necessary to unscrew the inner electrode from its operative position on the stud 45, and to machine it to remove small amounts of the inner end of this electrode in order to provide the precise cell constant. While I consider it preferable to remove small amounts at the base of the inner electrode, it is also within my contemplation to do this removal work on the outer or opposite end of the electrode, and if this outer end is machined, a form tool is used to retain the same indentation while shortening the overall length of the inner electrode 25.

The outer and inner electrodes 9 and 25 respectively, and the temperature compensation means, or the thermistor 51, are electrically connected to a suitable indicating system (not shown) through the medium of a three-way cable 89 in the following manner:

One wire 91 of the three-way cable system extends into the housing 39 through the rear open end thereof and through the tension nut 65, which is hollow, and extends through one of the saw cuts 57 in the frustrum shaped element 55, as is clearly shown in FIG. 2 of the drawing, and is connected as at 93 to one end of the thermistor 51. A further wire 95 of the three-way cable system is fixed to and electrically connected with the cell body 1 as at 97, while a third wire 99 of the three-way cable system is spliced, as at 101, to provide a wire 103 which is connected as at 105 to the other end of the thermistor 51. The wire 107, resulting from the splice in the wire 99, is electrically connected as at 109 to the thermistor housing 39.

The rear internal circumferential surface of the cell body 1 is threaded as at 111, and this internal surface of the cell body 1 is provided with a shoulder 113 forwardly spaced with respect to the threading 111. I provide a forward ring-gasket 115, which abuts against the shoulder 113 and rearwardly thereof and in abutment with the rear end thereof, I provide a rubber gasket 117, and rearwardly thereof and in abutment therewith is a ring-gasket 119. The gasket 117 seals the three-way cable system 89 which passes through the gasket, so that no moisture or other seepage may enter the cell body 1 from the rear end thereof. In order to maintain and compress the gasket, I provide a hollow gland nut 121 which is removably threaded on the threads 111 which are provided internally of the cell body 1.

This conductivity cell has been especially designed for combination with a co-axial valve, which is well known in the art, and to affect, a water tight seal between the conductivity cell and the end wall of such co-axial valve, I provide an O-ring 123 which surrounds the cell body 1, as is clearly illustrated in FIG. 1 of the drawing, and in order to maintain the O-ring in proper position I provide an O-ring stop element indicated in its entirely the numeral 125. Such O-ring stop comprises an upstanding annulus 127 which is soldered or otherwise affixed to the cell body 1, and from the upper end of this annulus 127 forwardly extends a continuous annular flange 129, the O-ring being maintained in position beneath the flange 129 and being maintained against the upstanding annulus 127 by its contact with the end wall of the co-axial valve.

With the various components of the valve assembled in operative condition, as illustrated in FIG. 1 of the drawings, the outer electrode being screwed on to the forward end of the cell body 1, it will be understood that the outer electrode 9 is in electrical contact with the cell body 1, the electric wire 95 while the inner electrode 25 is in electrical contact with the housing 39 through frame element 83 and washer 33, and with the electric wire 107.

When the conductivity cell is mounted in operative position within a solution, the conductivity of which is being measured, the body thereof from the O-ring 123 forwardly is positioned within the solution, so that the thermistor 51 is subjected to temperature variations of the solution through two thermal transfer paths. The axial path which comprises the inner electrode 25, the housing 39, and the frustum 55, and the thermistor is also subjected to temperature variations in the solution through a radial thermal transfer path which comprises the cell body 1, which is in contact with the solution, the tube 67 and the frustum 55.

It will also be appreciated that the inner and outer electrodes, and those elements which are in electrical contact therewith are all soundly insulated from each other, and the entrance of the solution, or seepage of moisture into the assembly is prevented. Thus, the inner electrode is insulated from the outer electrode by the glass or ceramic seal, and the insulation sheath 75, and the thermistor is insulated from the components by the insulating medium 53. It will also be recognized that the glass or ceramic seal serves a dual function, it insulates and it also prevents the solution from entering the assembly.

In FIG. 3 of the drawings I have illustrated the conductivity cell of FIG. 1 combined with a gate valve, and in the description of the combination of FIG. 3 I shall use the same reference numerals as used in the description of the cell of FIG. 1, for similar parts.

I have used the numeral 131 to designate, in its entirety, the gate valve having the usual manual control wheel 133, and the bowl or housing 135 having an opening transversely therethrough as at 137, through which the cell extends, as will be explained.

The valve is removably mounted in a T water pipe connection 139, so that the solution may flow into this connection. The portion 141 of the connection 139 is internally threaded as at 143, and a brass nipple 145 is threaded thereinto at one end, as at 147. The nipple 145 is externally threaded at its other end as at 149, and is threaded into internal threads of hexagon extension 151 which is integral and part of the housing 135 of the gate valve meeting at 153.

With the nipple 145 threaded into the pipe connection the conductivity cell is inserted through the valve so that the electrode 9 is positioned within the pipe fitting and within the solution for measuring (along with the inner electrode 25) the conductivity thereof.

Fixed in any suitable manner about the cell body 1 is a stop ring 155, the purpose of which will become clear as this description proceeds. As will be evident from consideration of the drawings the stop ring extends radially a distance beyond the external circumferential wall of cell body 1, and this is possible since the I.D. of nipple 145 is greater than the O.D. of cell body 1, and the same is true of the transverse opening in the gate valve through which the cell extends.

A coupling hex, designated generally by the numeral 157, comprises a central body portion 159, a radially inwardly extending annular flange 161 and an externally threaded sleeve 163 which extends forwardly from the body portion 159. The under surface of body portion 159, rearwardly of flange 161, is threaded as at 165.

The externally threaded sleeve 163 is threaded into the internal threads of hexagon extension 167 which is integral and part of the housing 135 of the gate valve. A gland nut 169 is screwed into the threading 165 of the coupling hex 157, the forward end thereof, when screwed into the coupling is spaced from the annular flange 161 of the coupling hex 157. In this space between the gland nut 169 and the annular flange 161 I position an O-ring 171 which, when the gland nut is fully screwed into the coupling hex, seals the rear end of the assembly against seepage of moisture. When the gland nut 169 is fully threaded onto the coupling hex 157, a threaded opening 171' which is formed in the gland nut will be in upper most position extending therethrough, such opening being generally parallel with the longitudinal axis of the gate valve 131. The cell 1 is provided with a circumferential groove 173 which is positioned below the threaded hole or aperture 171'. A lock-screw 175 is threadedly positioned in opening 171' in gland nut 169 and when fully threaded into the opening, the lower end thereof will extend into the circumferential groove 173. The gland nut 121 is combined with the assembly of FIG. 3 of the drawings in the same manner as is the same gland nut is combined with the assembly of FIG. 1 of the drawings, and functions in the same manner.

With the conductivity cell assembled with the gate valve, as illustrated in FIG. 3 of the drawings, it will be evident that the cell is locked into position to withstand pressure of the solution so that it will not be blown rearwardly from its operative position within the gate valve. The gland nut 121 is larger than the inside diameter of gland nut 169 and prevents the cell from being pulled inwardly under vacuum and limit positions the cell inwardly to align the lock-screw 175 to annular groove 173.

When it is desired to remove the cell from its mounting within the gate valve it will be recognized that provision should be made to prevent the inadvertent removal of the cell from the valve prior to closing the valve. I have provided means which prevents such inadvertent removal from the valve. In order to effect such removal the screw lock 175 is unscrewed from its position in the threaded hole 171' until the lower end of the stem thereof is removed from its locking position within the circumferential groove 173, whereupon the gland nut 121 is grasped and pulled rearwardly to move the conductivity cell assembly rearwardly with the stop ring 155 moving therewith until it abuts against the shoulder 177 which is provided by the annular flange 161 on the coupling hex 157. With the cell assembly in this position the outer electrode 9 will be moved rearwardly from beneath the gate valve so that the gate valve may be closed to prevent escape of the solution when the cell assembly is completely removed as will be described. With the stop ring 155 in stopping abutment with the shoulder 177, and the gate valve closed, the coupling 157 is unscrewed from valve extension 167 for removal of the conductivity cell assembly from the valve 131.

I claim:

1. A probe adapted to measure the conductivity of an electrolyte solution, including in combination, an elongated tubular body, the major portion thereof adapted to be inserted in the solution, a first electrode carried on the tubular body for insertion in the solution, and said tubular body and electrode being electrically connected, and connected for thermal transfer of solution temperatures therebetween, an elongated temperature compensation means, a housing positioned in the major portion of said tubular body and spaced therefrom, said housing having a body portion and a forward end projecting therefrom, and said temperature compensation means being positioned in the body portion of said housing in spaced relation thereto and completely received therein, a second electrode mounted on the forward end of said housing for insertion in the solution and in electrical contact with the housing and being thermally connected therewith for transfer of solution temperatures therebetween, said second electrode being in spaced relation with respect to said first electrode, means electrically insulating said first electrode and said tubular body from said second electrode, and from said housing, further means sealing the space between said tubular body and housing against entry of solution therein, and thermal transfer means in electrically insulated thermal transfer relation with said temperature compensation means and said tubular body, and in thermal transfer contact with said housing providing two thermal transfer paths from the solution to said temperature compensation means, said thermal transfer means including a wedge-shaped element in wedging thermal transfer contact with said temperature compensation means and said housing, and resilient means is provided and is in engagement with said wedge-shaped element to urge and maintain the latter in the aforesaid wedging thermal transfer contact.

2. A probe in accordance with claim 1, wherein said temperature compensation means is of elongated configuration and said wedge-shaped element is elongated and in thermal transfer relation with the major portion of the length of said temperature compensation means.

3. A probe in accordance with claim 1, wherein an electric wire is connected to each end of said temperature compensation means, and said wedge-shaped element is formed with two diametrically opposed longitudinally extending cuts therethrough and one of said wires extends through one of said cuts.

4. A probe in accordance with claim 1, wherein a tubular element is disposed between and in thermal transfer relation with said tubular body and said housing, and is electrically insulated from the latter, and said tubular element is formed with a longitudinally extending end to end cut therein.

5. A probe in accordance with claim 1, wherein said housing is formed with longitudinally extending diametrically opposed cuts along a portion of its length.

6. A probe in accordance with claim 1, wherein the forward end of said housing is solid and the rearward portion thereof is tubular, and the exterior diameter of said tubular portion is uniform throughout its length and the interior diameter thereof increases rearwardly at a uniform rate, and said element is positioned in said housing in contact therewith and embraces and is in contact with said temperature compensation means and said element is frustum shaped, the exterior surface thereof tapering forwardly.

7. A probe adapted to measure the conductivity of an electrolyte solution, including a tubular body and a first electrode mounted on one end thereof, a housing of less diameter than that of the tubular body and the housing being mounted in the tubular body, a second electrode mounted on one end of said housing, and means electrically insulating said first and second electrodes from each other and sealing the area between said tubular body and said housing against the entry of solution thereinto, said means comprising a pair of metallic annular members, one being fixed to said tubular body and the other being fixed to said housing, said metallic annular members being fixed in opposed, spaced radial relation, and a vitreous insulating material fixed to and extending between said metallic annular members.

8. A conductivity cell in accordance with claim 7, wherein each of said metallic annular members comprises an annulus and from one end of each extends an annular flange, said annular flanges being opposed and spaced apart and said vitreous insulating material extending in the space between said annular flanges and fixed thereto.

9. A probe in accordance with claim 7, wherein a chemical seal is provided between the metallic annular members and the vitreous material.

10. A probe in accordance with claim 9, wherein said metallic annular members are formed of nickel iron alloy.

References Cited

UNITED STATES PATENTS

| | | | |
|---|---|---|---|
| 1,670,640 | 5/1928 | Smith | 324—30 |
| 2,470,153 | 5/1949 | Feller | 324—30 X |
| 2,533,462 | 12/1950 | Ingram | 324—30 |
| 2,611,007 | 9/1952 | Cade et al. | 324—30 |
| 2,769,140 | 10/1956 | Obenshain | 324—30 |
| 2,780,773 | 2/1957 | Channon et al. | 324—30 |
| 2,810,879 | 10/1957 | Cade et al. | 324—30 |

RUDOLPH V. ROLINEC, Primary Examiner

C. F. ROBERTS, Assistant Examiner